United States Patent
Lesartre et al.

(10) Patent No.: US 10,824,465 B2
(45) Date of Patent: Nov. 3, 2020

(54) TRANSACTION REQUEST EPOCHS

(71) Applicant: HEWLETT PACKARD ENTERPRISE DEVELOPMENT LP, Houston, TX (US)

(72) Inventors: Gregg B. Lesartre, Fort Collins, CO (US); Derek Alan Sherlock, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 326 days.

(21) Appl. No.: 15/467,560

(22) Filed: Mar. 23, 2017

(65) Prior Publication Data
US 2018/0276029 A1    Sep. 27, 2018

(51) Int. Cl.
*G06F 9/46* (2006.01)

(52) U.S. Cl.
CPC .................. *G06F 9/466* (2013.01)

(58) Field of Classification Search
None
See application file for complete search history.

(56) References Cited

U.S. PATENT DOCUMENTS

| | | | |
|---|---|---|---|
| 6,584,103 B1* | 6/2003 | Hanaoka | H04L 29/06 370/351 |
| 2009/0222821 A1* | 9/2009 | Fromm | G06F 9/5016 718/101 |
| 2010/0082912 A1* | 4/2010 | Lesartre | G06F 13/1642 711/154 |
| 2016/0224425 A1* | 8/2016 | Hives | G06F 9/542 |
| 2018/0217901 A1* | 8/2018 | Fujii | G06F 9/48 |

* cited by examiner

*Primary Examiner* — Wynuel S Aquino
(74) *Attorney, Agent, or Firm* — Hewlett Packard Enterprise Patent Department

(57) ABSTRACT

A method may include receiving a first transaction request. The method may further include transmitting a retry response to the transaction request, which includes a first epoch identifier associated with a current epoch. The method may further include receiving a second transaction request, which includes a second epoch identifier associated with a previous epoch. The second transaction request may be fulfilled using a transaction resource reserved for the previous epoch.

7 Claims, 4 Drawing Sheets

TRANSACTION REQUEST EPOCHS

BACKGROUND

Lack of forward progress in interconnected systems can result in resource starvation, live lock, deadlock or other adverse conditions. For example, in a request-response communication protocol, multiple requesters (e.g., processors with integrated memory controllers) may be interconnected with multiple responders (e.g., memory components with integrated media controllers) via a fabric. The multiple requesters may contest for transaction resources at various points within the fabric. For example, a fabric bridge device may have a responder block to perform atomic operations, such as atomic persistent memory writes. The responder may have a limited number of atomic operations it can perform simultaneously, which may be contested for by connected requesters. Lack of forward progress may occur if some requesters are not able to successfully request an atomic operation.

BRIEF DESCRIPTION OF THE DRAWINGS

Certain examples are described in the following detailed description and in reference to the drawings, in which.

DETAILED DESCRIPTION OF SPECIFIC EXAMPLES

Implementations of the described technology may provide a forward progress screen that enables forward progress in large scale fabrics, such as exascale fabrics.

For example, in one implementation, a responder tracks a current epoch and a previous epoch. If a newly arriving transaction request cannot be serviced due to a lack of responder resources, the responder will assign the transaction request to the current epoch, and include the assigned epoch indication within the retry response it sends to the requester. When retransmitting the transaction request, the requester includes the assigned epoch indication in its retransmitted request.

A set of transaction resources are reserved by the responder for the previous epoch. If a responder receives a request with a previous epoch indication, then the responder may use the reserved resources to fulfill the request. If the responder receives a retransmitted request with the current epoch identifier, then the responder treats it like a new request, and cannot use the reserved resources to fulfill the request.

After a certain time has passed, the responder transitions to the next epoch. The indicator previously assigned to the previous epoch is now assigned to the current epoch, and the indicator previously assigned to the current epoch is now assigned to the previous epoch. Retransmitted transaction requests indicating the old current epoch are now recognized as belonging to the previous epoch and are favored over transaction requests from the new current epoch. In this manner, forward progress can be guaranteed without significant tracking or scoreboards.

Figure 1:
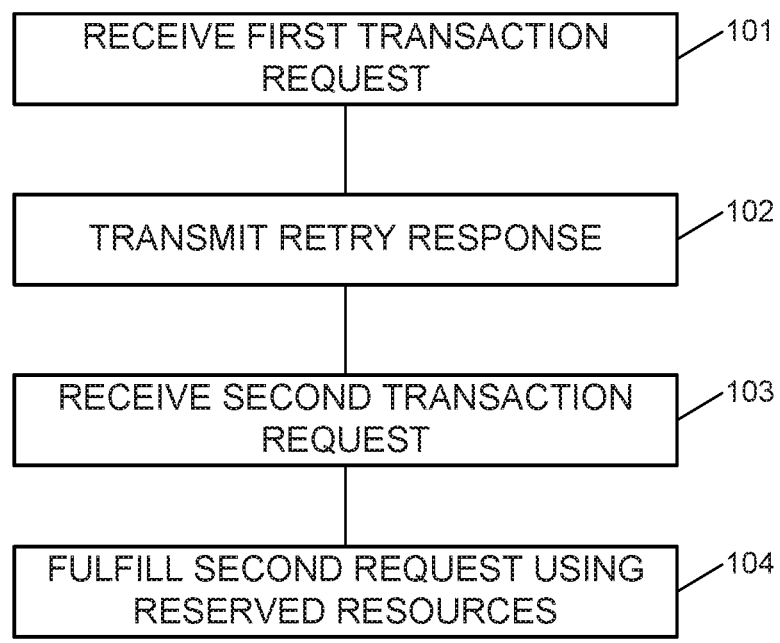
FIG. 1 illustrates an example method of operation of a responder device responding to transaction requests.

FIG. 1 illustrates an example method of operation of a responder device responding to transaction requests. For example, the transaction requests may be non-idempotent requests associated with a finite transaction resource held by the responder, such as atomic operation requests or buffer operation requests. In this example, the responder tracks a current epoch and reserves resources dedicated to servicing retransmitted requests from previous epochs. The responder device may implement the illustrated method via hardware, such as in application specific integrated circuits (ASICs) or field programmable logic devices (FPGAs), in software or firmware stored in a non-transitory computer readable medium and executed by the a processing device, or a combination thereof.

The example method includes block 101. Block 101 may include receiving a first transaction request. For example, the first transaction request may be a buffer put or buffer get request. In this example, the responder supports buffer operations to transfer data contained in one buffer to another. A buffer put results in the responder performing a series of writes to copy data located in a first buffer to a second buffer. While a buffer get request results in the responder performing a series of reads to copy data located in another buffer into its buffer. The responder may support only a limited number of simultaneous buffer operations.

As another example, the first transaction request may be an atomic operation request. In this example, the responder may support atomic requests that allow addressed memory locations to be accessed and optionally modified without interference from other in-flight requests. For example, a responder may support fetch-and-add requests, add immediate requests, swaps, compare and swap operations, atomic logical operations, or other atomic operations. Again, any given responder block may support only a limited number of simultaneous atomic operations.

In some implementations, the transaction request may have a field indicating whether the request is a retransmitted request or a new request. For example, in an implementation with two epochs, the field may be a forward progress screen field (FPS) that can contain a "No Epoch," "Epoch 0" or "Epoch 1" indicator. In one example, if a requester transmits a new request packet or a retransmits a packet for any reason other than receipt of a previous retry response, then the requester sets the FPS field to No Epoch. If the requester retransmits a packet in response to receipt of a previous retry response, then the requester includes the FPS indicator included in the retry response. In the illustrated example, the transaction request received in block 101 may include a No Epoch identifier or the identifier associated with the current epoch.

The method may further include block 102. Block 102 may include transmitting a retry response to the transaction request. The retry response may be sent in response to the responder determining that it has no free and unreserved resources that can be used to service the request. For example, the retry response may be a negative acknowledgement (NAK) that indicates that the responder is not ready (RNR). For example, the RNR NAK may indicate that transient oversubscription of the requested resource has occurred and that the requester may retransmit the request. The retry response includes a first epoch identifier that is associated with a current epoch. For example, the retry response may have a designated reason field. The reason field may include the identifier associated with the current epoch.

The method may further include block 103. Block 103 may comprise receiving a second transaction request. The second transaction request may include a second epoch identifier associated with the previous epoch. For example, in a two epoch implementation, if the responder's current epoch is associated with the Epoch 0 identifier, then the second identifier is Epoch 1.

The method further includes block 104. Block 104 includes fulfilling the second transaction request using a transaction resource reserved for the previous epoch. For example, block 104 may include the responder determining that there are no free unreserved resources but that there are free resources reserved for servicing requests from the previous epoch.

Figure 2:
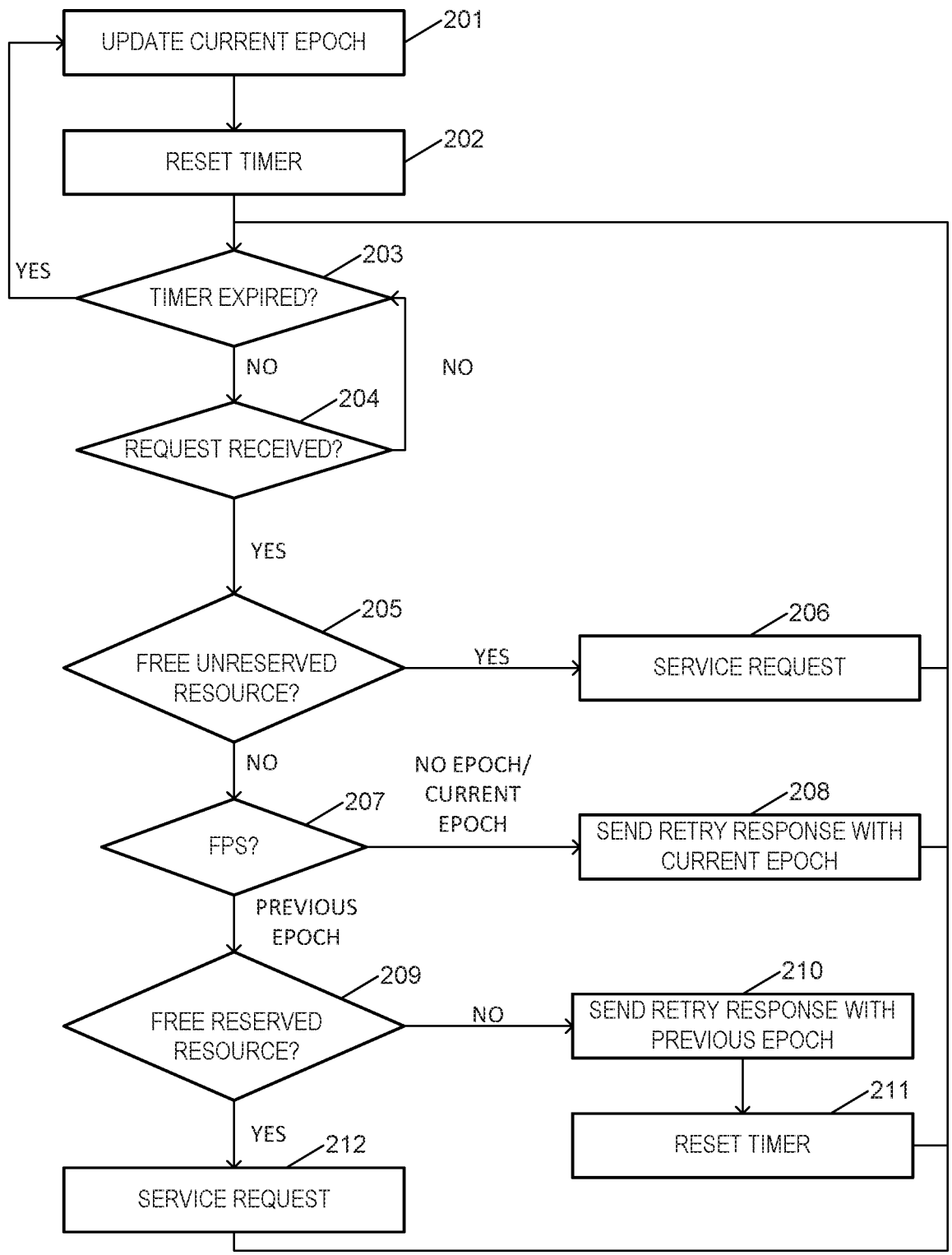
FIG. 2 illustrates an example method of operation of a responder device responding to transaction requests.

FIG. 2 illustrates an example method of operation of a responder device responding to transaction requests. For example, a responder may perform the method of FIG. 2 as an extension of performing the method of FIG. 1. In the example method, available reserved or unreserved resources are used to execute request packets that are retransmitted from previous epochs (for example, whose FPS fields include a prior epoch identifier. Only unreserved resources are used to execute requests from the current epoch or requests without an epoch identifier. If there are no resources available, then the responder responds with a retry response.

The example method begins with block 201. Block 201 includes updating the current epoch identifier. In this implementation, Block 201 includes associating each of a set of identifiers with a corresponding epoch.

At system startup, the first time block 201 is executed, the system may arbitrarily associate the epoch identifiers with the tracked epochs. For example, in a system with two identifiers, block 201 may comprise associating Epoch 1 with the current epoch and Epoch 0 with the previous epoch. In a system with three identifiers, block 201 may comprise setting Epoch 2 as the current epoch, Epoch 1 as the youngest previous epoch, and Epoch 0 as the oldest previous epoch.

When block 201 is executed in future iterations, block 201 may comprise performing an epoch transition. An epoch transition may comprise associating the oldest epoch with the current epoch, and associating each remaining identifier of the set of identifiers with a next older epoch. In other words, during an epoch transition, the epoch identifiers are cycled such that the identifier currently associated with the oldest epoch is associated with the current epoch, and each other identifier is associated with the next-oldest epoch. For example, in a system with two identifiers, if Epoch 1 is associated with the current epoch and Epoch 0 is associated with the previous (i.e., oldest) epoch, then block 201 may comprise associating Epoch 1 with the previous epoch and Epoch 0 with the current epoch. In an example system with three identifiers, with Epoch 2 associated with the current epoch, Epoch 1 with next older epoch, and Epoch 0 with the oldest epoch, block 201 my comprise associating Epoch 2 with the next older epoch, Epoch 1 with the oldest epoch, and Epoch 0 with the current epoch.

After updating the epoch associations, the system proceeds to block 202. In block 202, an epoch transition timer is reset. While the responder is in active operation, it maintains the epoch timer transition timer. The timer is used to determine when the system performs an epoch transition. For example, the timer may be set based on a maximum lifetime of transactions in the fabric. For example, the timer may be set to accommodate the maximum time for a retry response to traverse the fabric and arrive at the requester, for the requester to process the retry response and retransmit the request, and for the retransmitted request to traverse the fabric and arrive at the responder.

In other implementations, other system-defined time lengths may influence the length of the epoch transition timer. For example, the retry response may include a retransmission time interval field that defines when the requester is allowed to retransmit the request. Additionally, system requesters may maintain retransmission timers, which define the length of time they will wait before retransmitting a request on their own (i.e., without receiving a retry response). In these implementations, the epoch transition timer may be set to be a value greater than the sum of the maximum retransmission time that the requester uses in its retry responses, the maximum peer requester retransmission timer, and the maximum one-way transmission time of a request packet from any peer requester.

The method proceeds to blocks 203 and 204, where the system waits for a request until the timer expires. If the timer expires in block 203, then the system returns to block 201 to perform an epoch transition. If a request is received in block 204, then the system proceeds to block 205.

In block 205, the requester determines if there is are free unreserved resources to service requests. If there are, then the system proceeds to block 206 and services the request using the free resources. The requester then returns to blocks 203 and 204 and continues to wait for further requests or the expiration of the timer.

If there are no free, unreserved resources, then the responder proceeds to block 207. In block 207, the responder determines if the request is a retransmitted request. For example, the responder may inspect a forward progress screen field from the request.

If the request is not a retransmitted request, or is a retransmitted request from the current epoch, then the responder proceeds to block 208. In block 208, the responder sends a retry response to the request, the response including the current epoch identifier. For example, block 208 may be performed as described with respect to block 102 of FIG. 1. The system then proceeds to block 203 to wait for the next packet before the expiration of the timer.

If the request is a retransmitted request that includes an identifier associated with a previous epoch, then the system proceeds to block 209 and determines if there are reserved resources available to service the request. The system reserves resources for each previous epoch. For example, a responder may reserve a slot for atomic or buffer operation processing for requests from the previous epoch. In some implementations, the reserved resources may be dedicated resources for the previous epoch. In other implementations, the resources may be reserved by not allocating a last set of resources from a pool except for retransmitted requests from the previous epoch. In some cases, a single slot is reserved for each previous epoch. In other cases, two or more slots may be reserved for previous epochs. In systems with more than one previous epoch, the same number or differing numbers of resources may be reserved for different epochs. For example, a single slot reserved for the oldest epoch, two slots reserved for the next-younger epoch, and so on.

If resources reserved for the epoch associated with the identifier from the retransmitted request are available, then the responder proceeds to block 212 and services the request using the reserved resources. The responder then returns to block 203 to wait for the next packet or expiration of the epoch transition timer.

If resources are not available, then the responder proceeds to block 210. In block 210, the responder sends a retry response that includes the same identifier as was included in the request. Accordingly, when the requester retransmits the request again, the retransmitted request will again include the previous epoch identifier and will qualify for the reserved resources.

The system then proceeds to block 211 and resets the epoch transition timer. Resetting the epoch transition timer ensures that the requester can process the retry response sent in block 210 and retransmit the request again. The system then proceeds to block 203 to wait for the next request or expiration of the (newly reset) epoch transition timer.

In implementations with more than two epoch identifiers, block 210 may be performed only when the retransmitted request is from the oldest epoch. In other words, only sending a retry response with the indicator currently associated with the oldest epoch triggers the timer reset.

Various other implementations may differ from the illustrated implementation. For example, a given device may include more than one responder block. For example, a device may support different atomic operations, with different responder blocks for the different operations. As another example, the device might support various atomic operations with a first responder block, and various buffer operations with another responder block.

In some cases, a multiple-responder device might maintain a single component-wide epoch transition timer. In these cases, the device maintains independent sets of reserved resources associated with the different responder blocks, but synchronizes transitions between epochs across the responder blocks. In other words, each responder block transitions epochs at the same time, so each block is in the same epoch at the same time.

In other cases, a multiple-responder device might maintain separate epoch transition timers for each responder block. In these cases, the device maintains independent sets of reserved resources associated with the different responder blocks and each responder block might be in a different epoch at any given time.

In further implementations, responders may be allowed to silently discard received requests that cannot be serviced rather than transmit retry responses. In some cases, the responder may silently drop packets when dictated by other provisions of the communication protocol. For example, the communication protocol may dictate various responder latency limits that impact how long a transaction can exist in the fabric. The responder may silently drop packets if such limits would otherwise be exceeded. In other cases, the responder may optionally silently discard transaction requests. In such cases, the requester may retransmit a new request after its retransmission timer expire. In some implementations, if the silently dropped request was a retransmitted request, the requester may include the same epoch number in the retransmission. In other implementations, the requester may only include epoch identifiers in retransmitted requests that are triggered by retry responses and may not include an epoch identifier in a retransmission triggered for other responses.

Figure 3:
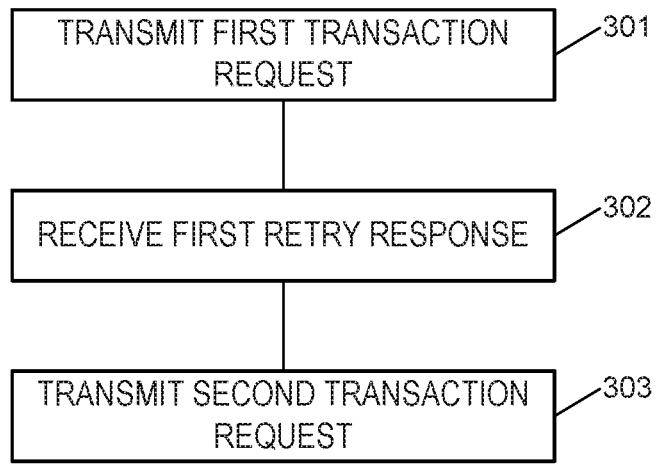
FIG. 3 illustrates an example method of operation of a requester.

FIG. 3 illustrates an example method of operation of a requester. For example, the requester may be a memory controller coupled to a processor of a computer. The requester may perform the illustrated method in hardware, such as in application specific integrated circuits (ASICs) or field programmable logic devices (FPGAs), in software or firmware stored in a non-transitory computer readable medium and executed by the a processing device, or a combination thereof.

The example method includes block 301. Block 301 includes transmitting a first request to a responder. For example, the responder may be a responder of the type described above, and the first request may be a non-idempotent request such as a buffer operation request or an atomic operation request.

The first transaction request may include a field indicating whether the request is a new request, and, if applicable, an epoch identifier. If the first request is a new request, then the field indicates this fact and does not include an epoch identifier. If the first request is a retransmission of a previous transaction request, then the field indicates that the request is a retransmission and includes an epoch identifier.

The example method further includes block 302. Block 302 includes receiving a retry response in response to the first transaction request. The retry response includes an epoch identifier. For example, block 302 may comprise receiving a RNR NAK packet in response to the transaction request, the RNR NAK including a reason field that provides the epoch identifier.

The example method further includes block 303. Block 303 includes transmitting a second transaction request retransmitting the first transaction request sent in block 301. The second transaction request includes the epoch identifier from the retry response received in block 302. For example, the requester may set a forward progress screen field of the request to include the epoch identifier received in block 302.

Figure 4:
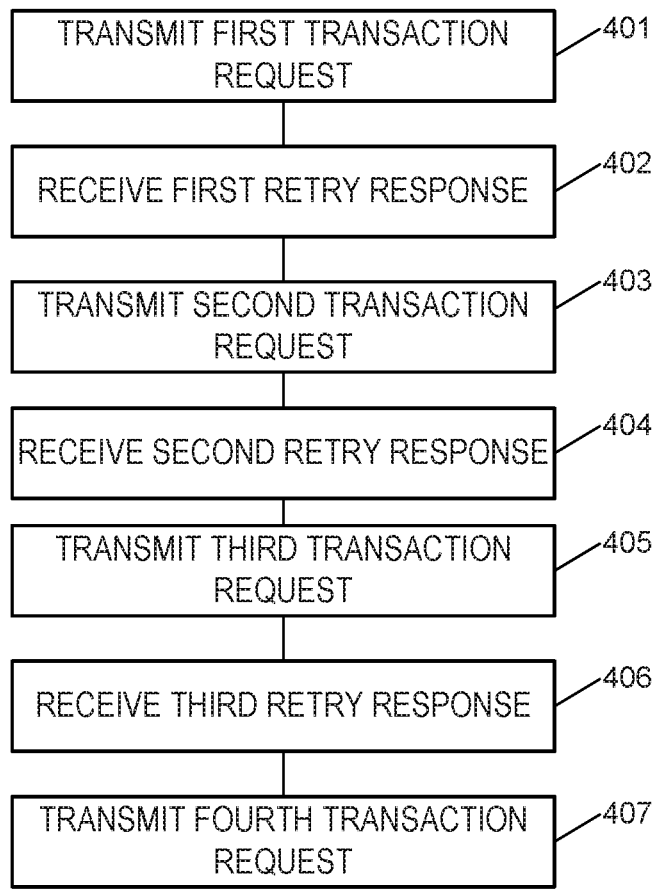
FIG. 4 illustrates another example method of requester operation.

FIG. 4 illustrates another example method of requester operation. In the illustrated method, a requester does not include an epoch identifier in new requests or in requests that are retransmitted for reasons other than receipt of a retry response indicating an epoch. For retransmitted requests due to such retry responses, the requester includes the same epoch identifier as included in the retry response (e.g., as in the RNR NAK that triggered the retransmitted request).

The method includes blocks 401, 402, and 403. These blocks may be performed as described with respect to blocks 301, 302, and 303 as described with respect to FIG. 3. In block 401, the requester transmits a first transaction request, indicating that the request is a new request. In block 402, the requester receives a first retry response from the responder, the first retry response including a first epoch identifier. In block 403, the requester retransmits the transaction request by sending a second transaction request that includes the first epoch identifier.

The method further includes block 404. Assuming the responder is not ready to respond to the request, the responder sends another retry response. Block 404 includes receiving the second retry response from the responder. The second retry response includes the same first epoch identifier as the first retry response and the second transaction request.

The method further includes block 405. In block 405, the requester sends a third transaction request. In this example, the third transaction request is not related to the first and second transaction requests. The third transaction request may include an indicator that the request is a new request and does not include an epoch identifier.

The method further includes block 406. Block 406 assumes that the responder cannot service the request and that it occurs after the responder has performed an epoch transition. In block 406, the requester receives a third retry response, the third retry response including a second epoch identifier.

The method further includes block 407. In block 407, the requester retransmits the third transaction request by sending a fourth transaction request that includes the second epoch identifier received in block 406.

Figure 5:
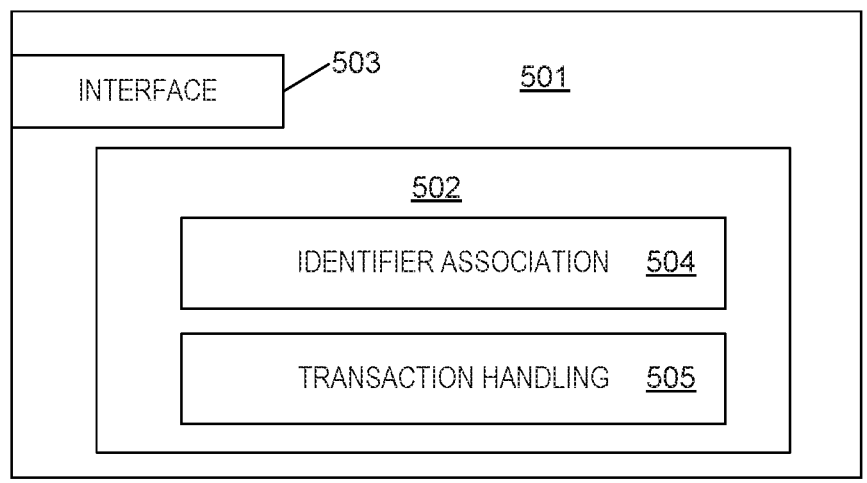
FIG. 5 illustrates an example device including a responder block.

FIG. 5 illustrates an example device 501 including a responder block 502. For example, the device 501 may be a memory device including a media controller. The device 501 may support non-idempotent operations, such as buffer operations or atomic operations. For example, the device 501 may include logic to operate as described with respect to FIGS. 1 and 2. The device 501 is illustrated as containing various logic blocks. In various implementations, these blocks may be implemented in hardware, such as in application specific integrated circuits (ASICs) or field programmable logic devices (FPGAs), in software or firmware stored in a non-transitory computer readable medium and executed by the a processing device, or a combination thereof.

The device 501 includes a responder block 502. The responder block 502 receives transaction requests via an interface 503. For example, the interface 503 may connect the device 501 to a fabric, such as a memory fabric, a bus, or other channel connected to one or more requester devices.

The device 501 includes logic 504 to maintain an association between epochs and epoch identifiers. For example, logic 504 may maintain an a set of identifiers, each identifier associated with a corresponding epoch. Each of the epoch may be associated with a different temporal period. For example, in a dual epoch implementation, there is a current epoch and a previous epoch. At any given time, a first identifier is associated with the current epoch and a second identifier is associated with the previous epoch.

The device 501 further includes logic 505 to handle transaction requests. For example, the logic 505 may include logic to determine if a received transaction request is a new transaction request or a retransmitted request. For example, the transaction request may include a field including an identifier that indicates a new transaction request or a retransmitted request with an epoch identifier. For example, the logic 505 may execute to inspect an FPS field of the transaction request and to determine if the FPS field includes a no epoch or new request identifier (indicating that the transaction request is a new request), or an epoch identifier (indicating that the transaction request is a retransmitted request).

If the request is a new transaction request or a retransmitted transaction request that contains the current epoch identifier, then the logic 504 attempts to use unreserved transaction resources to service the request. If there are unreserved resources available then the logic 504 services the request. If unreserved resources are not available then the logic 504 returns a retry response via the interface 503. The retry response includes the current epoch identifier. For example, retry response may have a reason field that includes the current identifier.

If the request is a retransmitted transaction request that includes a previous epoch identifier, then the logic 504 attempts to use unreserved transaction resources or reserved transaction resources to service the request. In some implementations, the logic 504 may prioritize use of unreserved resources over reserved resources. In these implementations, if unreserved resources are available, then the logic 504 services the request using the unreserved resources. If unreserved transaction resources are not available, and reserved resources for the previous epoch are available, then the logic 504 services the request using the reserved resources. If neither unreserved nor reserved resources are available, then the logic 504 returns a retry response that includes the previous epoch identifier.

In some implementations, there are multiple previous epochs. In these implementation, each epoch older than the current epoch may have an associated set of reserved transaction resources. The logic 605 may service the request including the previous epoch identifier with the associated set of reserved transaction resources.

Figure 6:
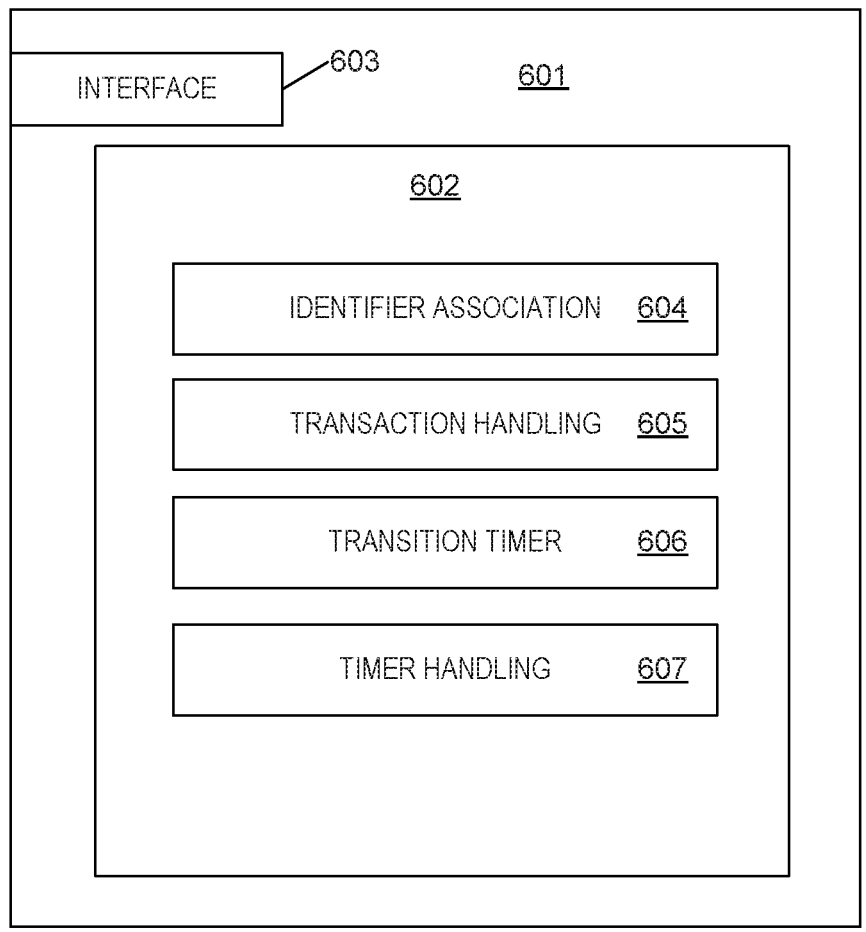
FIG. 6 illustrates a second device including a responder block.

FIG. 6 illustrates a second device 601 including a responder block 602. For example, the device 601 may be a memory device including a media controller. The device 601 may support non-idempotent operations, such as buffer operations or atomic operations. For example, the device 601 may include logic to operate as described with respect to FIGS. 1 and 2. The device 601 is illustrated as containing various logic blocks. In various implementations, these blocks may be implemented in hardware, such as in application specific integrated circuits (ASICs) or field programmable logic devices (FPGAs), in software or firmware stored in a non-transitory computer readable medium and executed by the a processing device, or a combination thereof.

The device 601 includes a responder block 602. The responder block 602 receives transaction requests via an interface 603. For example, the interface 603 may connect the device 601 to a fabric, such as a memory fabric, a bus, or other channel connected to one or more requester devices.

The responder block 602 includes logic 604 to maintain an association between epochs and epoch identifiers and logic 605 to perform transaction request handling. For example, these logic blocks may be as described with respect to logic 504 and 505 of FIG. 5.

The responder block 602 further includes an epoch transition timer 605. Some responder devices may include more than one responder block. In some implementations, each responder block 602 may have its own transition timer 606, as illustrated. In other implementations, multiple responder blocks 602 may share a timer. For example, the device 601 may have a single component-wide timer that each block 602 can access. The timer 606 may have a configurable length. For example, the responder block 602 may receive a command to set the timer length via the interface 603, or through an out-of-band command. The timer length may be set to a value to accommodate requester retransmission timers, maximum trip lengths, or other system timers as described above.

The responder block 602 further includes logic 607 to maintain the transition timer 606. For example, the logic 607 may set the length of the transition timer as described above. The logic 607 may also reset the timer upon certain conditions. For example, the logic 607 may reset the epoch transition timer when the epoch transition timer expires. The logic 607 may also reset the timer to allow transaction requests from previous epochs to make progress. For example, the logic 607 may reset the epoch transition timer 606 whenever a retry response including the identifier associated with the oldest epoch is returned by logic 605. As another example, the logic 607 may reset the epoch transition timer 606 whenever a transaction request containing an oldest epoch identifier is received by logic 605. In another example, the logic 607 may reset the epoch transition timer 606 whenever a transaction request containing an oldest epoch identifier is received and cannot be serviced by logic 605.

In the illustrated example, the logic 604 performs an epoch transition when the timer expires. For example, the logic 604 may re-associate an identifier of the set associated with an oldest epoch with the current epoch and to re-associate each other identifier of the set with a next-older epoch when the epoch transition timer expires.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

The invention claimed is:

1. A method, comprising: receiving a first transaction request; transmitting a retry response to the transaction request, the retry response including a first epoch identifier associated with a current epoch; receiving a second transaction request, the second transaction request including a second epoch identifier associated with a previous epoch; and fulfilling the second transaction request using a transaction resource reserved for the previous epoch; associating each of a set of identifiers with a corresponding epoch, wherein the first epoch identifier and second epoch identifier are elements of the set of identifiers and the previous epoch is an oldest epoch: performing an epoch transition, comprising: associating the second epoch identifier with the current epoch; and associating each remaining epoch identifier of the set of identifiers with a next older epoch.

2. The method of claim 1, further comprising: running an epoch transition timer from a last sent retry response that included the second epoch identifier associated with the previous epoch; and upon expiration of the epoch transition timer, associating the second epoch identifier with the current epoch and associating the first epoch identifier with the previous epoch.

3. The method of claim 2, wherein the length of the epoch transition timer is based on a maximum lifetime of transactions in a fabric carrying the transactions.

4. The method of claim 1, further comprising reserving transaction resources for each previous epoch.

5. The method of claim 1, further comprising: maintaining an epoch transition timer; and performing an epoch transition upon expiration of the epoch transition timer.

6. The method of claim 1, further comprising: receiving a third transaction request, the third transaction request including the second epoch identifier; and transmitting a second retry response to the third transaction request, the second retry response including the second epoch identifier.

7. The method of claim 1, wherein the first transaction request includes an information element indicating that the transaction request is not a retransmitted request.

* * * * *